[Patent No.] 3,551,001
Patented Dec. 29, 1970

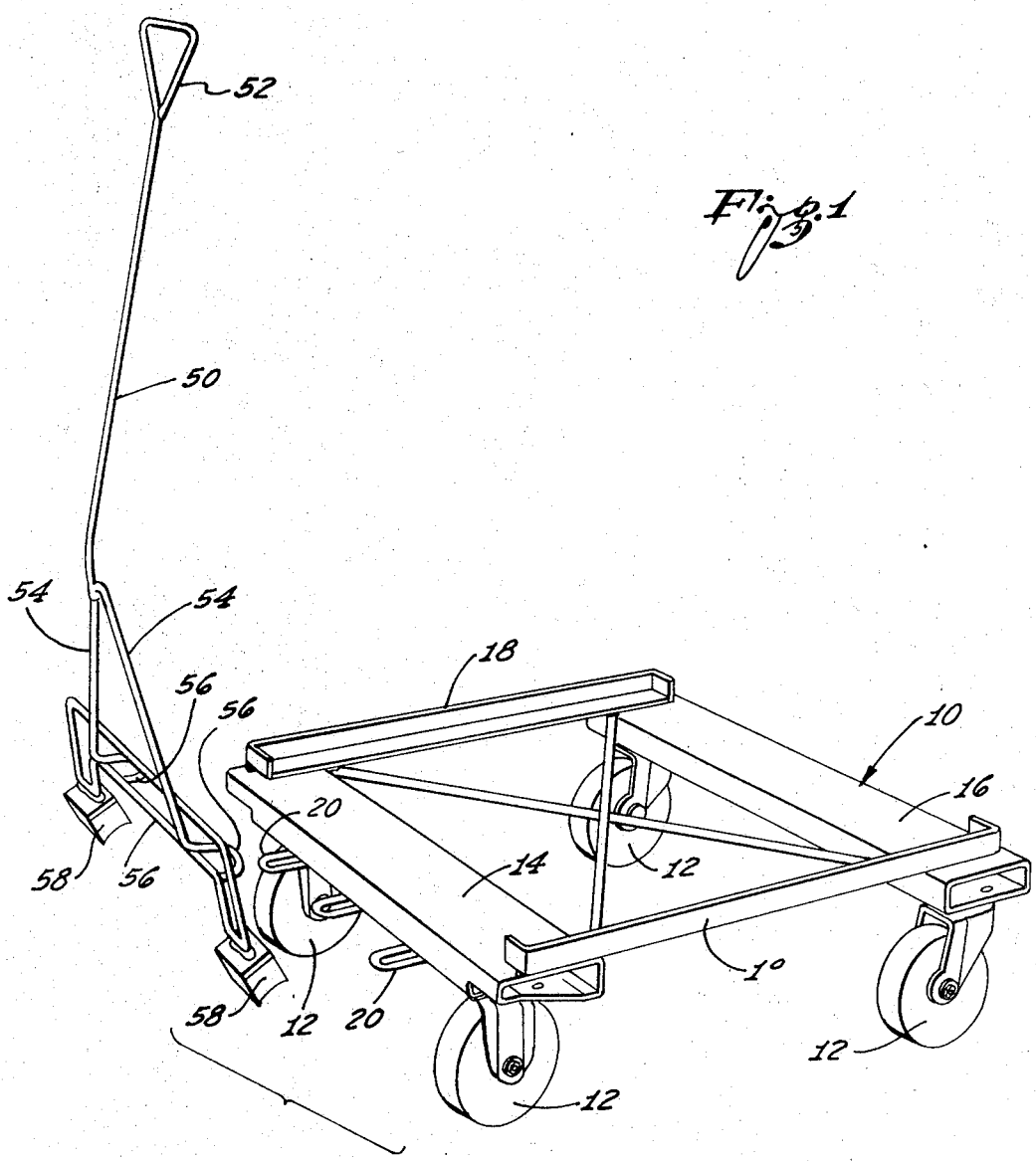

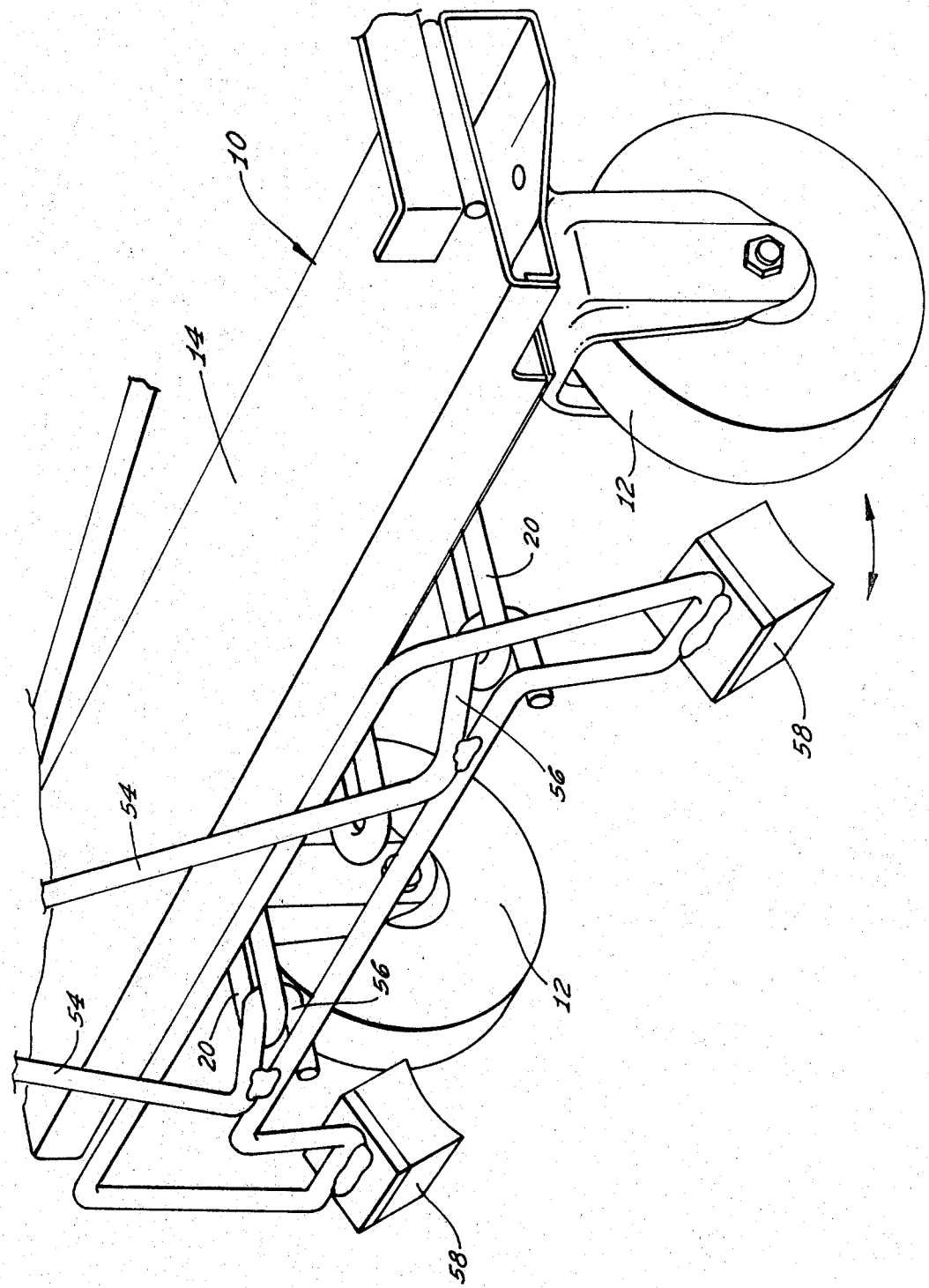

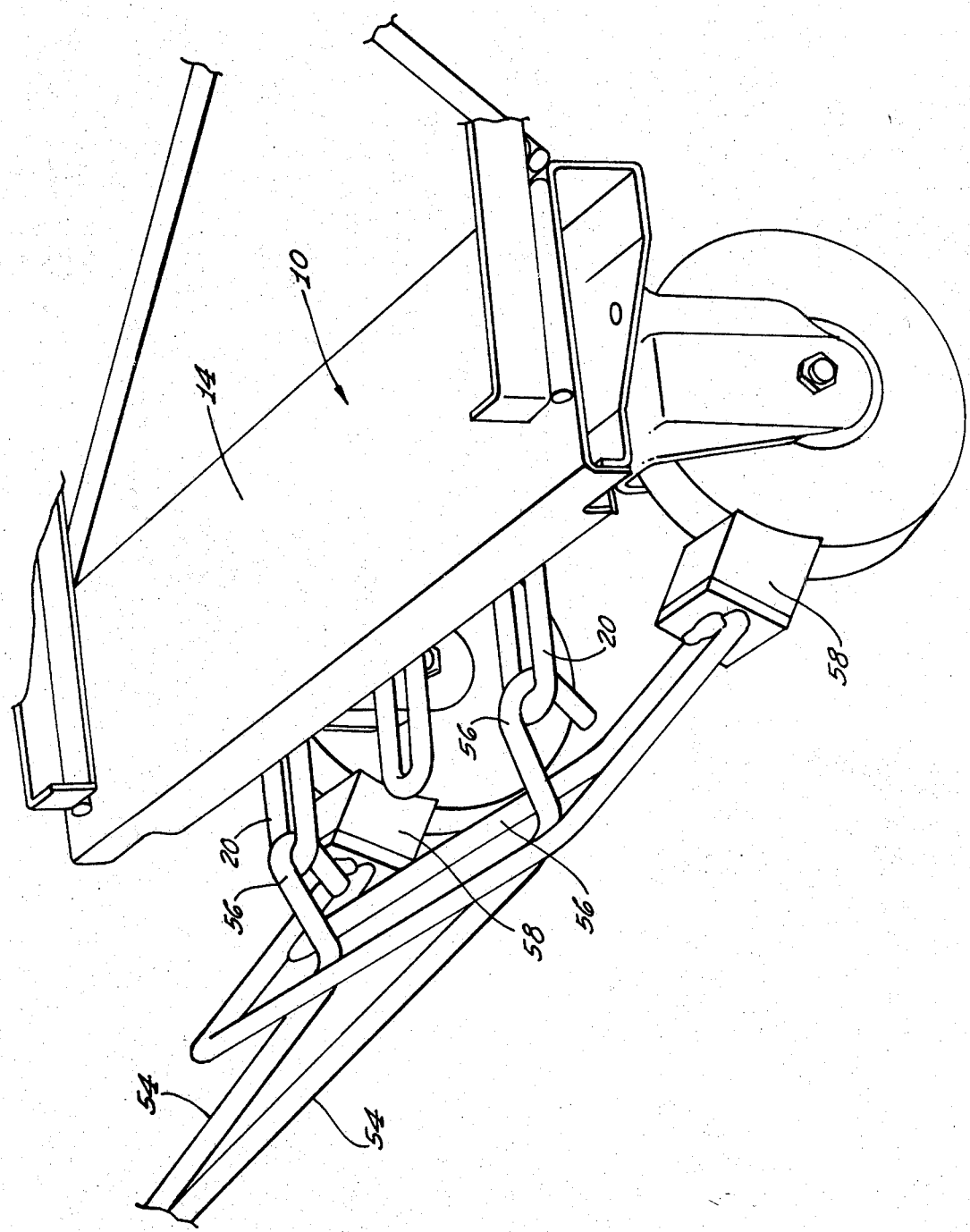

3,551,001
DETACHABLE HAND BRAKE ASSEMBLY
James D. Wilson, Long Beach, Calif., assignor to Banner Metals, Inc., Compton, Calif., a corporation of Ohio
Filed Feb. 20, 1969, Ser. No. 801,119
Int. Cl. B62b 3/02
U.S. Cl. 280—47.34      6 Claims

ABSTRACT OF THE DISCLOSURE

A detachable hand brake is provided for use with a wheeled carriage, such as a dolly. The detachable hand brake of the invention provides a handle for guiding the wheeled carriage down the inclined surface, and it also provides a brake for controlling its downward motion. The detachable hand brake of the invention obviates the need for a separate hand brake on each carriage, and it is particularly useful when a large number of the carriages are to be wheeled down an inclined surface as successive individual operations, and when such movement of the carriages occurs only in relatively rare instances.

BACKGROUND OF THE INVENTION

Copending application Ser. No. 776,739 filed Nov. 18, 1968, describes and claims a ramp for removing loaded dollies from a truck. The ramp described in the copending application enables the dollies and their loads to be removed from the truck in an easier and improved manner as compared with the prior practices in the art. The detachable hand brake of the present invention is particularly suited for use with such dollies as they are moved down the inclined ramp, so as to control the downward movement of the individual dollies in a simple and expedient manner.

The detachable hand brake of the present invention is particularly useful, as mentioned above, for handling a large number of dollies, or equivalent wheeled carriages, which normally do not require a hand brake; so that the provision of a separate hand brake for each of the dollies would constitute a wasteful additional component, which not only would add to the expense of the dollies, but would also add to the individual weight and size thereof.

Although the hand brake of the invention has been described in conjunction with dollies, and although such a carriage is shown in the accompanying drawing, it will be evident as the description proceeds that the concept of the present invention is not limited to dollies. Rather, the hand brake of the invention may be used in conjunction with any type of wheeled carriage, where it is desirable to guide and control the movement of such a wheeled carriage down an inclined plane.

As explained above, the principal purpose of the detachable hand brake of the invention is to control the movement of a wheeled carriage down an inclined plane. As also explained, the detachable hand brake of the invention is particularly useful when a plurality of such wheeled carriages are to be moved down the inclined plane, as a series of successive independent operations. When such is the case, a single hand brake may be used for all of the carriages, thus eliminating the need for a separate hand brake for each carriage.

Therefore, a principal object of the invention is to eliminate the need for each of a multiplicity of wheeled carriages to carry its own hand brake at all times, even when such a hand brake is not required. Instead, a separate hand brake is provided which, for example, may be carried on the truck, and which may be used on the relatively rare occasions when the carriages are to be moved down an inclined ramp from the truck.

BRIEF DESCRIPTION OF THE DRAWINGS

FIG. 1 is a perspective view showing a typical wheeled carriage, or dolly, and also showing a hand brake constructed in accordance with the concepts of the invention;

FIG. 2 is another perspective showing a portion of the wheeled carriage with the detachable hand brake attached and in a braking position; and FIG. 3 is a further perspective view showing the same portion of the carriage as shown in FIG. 2, and with the hand brake attached but in a non-braking position.

DETAILED DESCRIPTION OF THE ILLUSTRATED EMBODIMENT

The wheeled carriage shown in the drawings in the particular illustrated embodiment is a dolly 10, and the dolly may be of the type described, for example, in the copending application Ser. No. 776,739 filed Nov. 18, 1968. The dolly 10 includes a rectangular base, and it also includes a plurality of wheels 12 which are pivotally mounted at each corner of the base. The base itself, for example, includes a front transverse member 14 and a rear transverse member 16, the wheels 12 being pivotally supported by the transverse members. The transverse members 14 and 16 are intercoupled by a pair of side channel members 18 and 20, which are welded, or otherwise affixed to the transverse members.

In the practice of the present invention, a pair of spaced horizontal looped members 20 are welded, or otherwise affixed to the underside of the transverse member 14, and the looped members 20 protrude beyond the front edge of the transverse member. The transverse member 14, as well as the other components of the dolly, may be composed of steel, or other appropriate material. The loops 20 may be formed of steel rod, or other material, bent into the illustrated shape, and secured as by welding, or other means to the underside of the transverse member 14. The loop members 20 constitute a part of a bracket coupling means, by which the detachable hand brake of the present invention may be detachably coupled to the dolly.

The detachable hand brake, as best shown in FIG. 1, includes an elongated handle portion 50 having a loop 52 at one end which may be grasped by the operator. The handle 50 and the loop 52 may be formed of a single rod, as illustrated, and may be of the same composition and size, for example, as the rods forming the loops 20. A further rod 54 which is bent into a V-shape is welded, or otherwise affixed, at its apex to the end of the handle 50 remote from the loop 52. The ends of the rod 54 are shaped into hooks 56 which are positioned to be received by the respective loops 20 when the hand brake is hooked onto the loops, as shown in FIGS. 2 and 3.

The hooks 56 on the hand brake constitute a second part of the coupling bracket means for the hand brake. When the hooks are hooked onto the loops 20 of the carriage 10, the hand brake constitutes a handle for guiding the wheeled carriage. The coupling bracket means formed by the loops 20 and the hooks 56 provides a pivot axis for the hand brake. The hand brake may be turned up and down about the pivot axis with respect to the plane of the base of the wheeled carriage 10, when it is coupled to the dolly, as shown in FIGS. 2 and 3.

A further rod is shaped into a closed loop 56 having the configuration shown in the drawings, and the resulting loop is welded, or otherwise attached to the loop 54, with the loop 56 extending transversely to the longitudinal axis of the handle 50, as shown. The loop 56 also includes end portions which extend on the opposite of the aforesaid pivot point, and a pair of braking members 58 are attached to the ends of the loop, by welding, or other appropriate means. The braking members 58 include portions of brake lining material, for example. The braking members are positioned adjacent the wheels 12 which are supported by the transverse member 14.

It will be apparent that when the hand brake handle 50 is turned down about the pivot axis to the position shown in FIG. 2, the braking members 58 are caused to engage the rims of the wheels 12 so as to exert a braking action on the carriage. However, when the handle is turned up about the pivot axis to the position shown in FIG. 3, the brake members 58 are released from the wheels 12, so that the carriage is free to move, and yet may be guided by the handle 50.

Therefore, by the appropriate manipulation of the handle 50 the wheeled carriage 10 may be guided easily and conveniently, either down an inclined surface, or along a horizontal surface. Then, by manipulation of the handle up or down, the forward wheels 12 of the carriage may be either engaged or released by the braking members 58, so as to provide a controlled braking action for the assembly.

What is claimed is:

1. A combined hand brake and guide handle assembly for use with a wheeled carriage, said carriage having a base with end edges and side edges, a plurality of wheels secured to said base, and coupling bracket means affixed to at least one of said end edges; said assembly including an elongated guide handle portion of such length as to be manipulable by an operator from a supporting surface external of said carriage and a transverse inverted U-shaped bracket portion affixed to one end of said handle portion; coupling bracket means affixed to said U-shaped bracket portion and configured to be detachably received by said coupling bracket means on said carriage, said coupling bracket means on said assembly and on said carriage constituting a horizontal pivot axis for said assembly and permitting said handle portion to be turned up and down with respect to the plane of said base about said pivot axis; and braking means affixed to said U-shaped bracket portion and extending on the opposite side of said pivot axis from said handle portion so as to engage at least one of the wheels of said carriage and provide a braking means for said carriage as said handle is turned in a particular direction about said pivot axis.

2. The hand brake defined in claim 1, in which said coupling bracket means on said carriage includes a plurality of looped members affixed thereto and protruding beyond one of the end edges thereof, and in which said coupling bracket on said U-shaped bracket portion includes a plurality of hooks positioned along said horizontal pivot axis and in position to be detachably received by respective ones of said looped members on said carriage.

3. The hand brake defined in claim 1, in which said braking means includes first and second brake members attached to said U-shaped bracket and displaced along an axis spaced from and parallel to the aforesaid horizontal pivot axis and in position to engage two of the wheels of said carriage as said handle portion is turned down about said horizontal pivot axis.

4. In combination a combined detachable hand brake and guide handle assembly and a wheeled carriage, said carriage having a base with end edges and side edges, and said carriage further having a plurality of wheels secured to said base, and coupling bracket means affixed to at least one of said end edges; and said assembly including an elongated guide handle portion of such length as to be manipulable by an operator from a supporting surface external of said carriage and a transverse inverted U-shaped bracket portion affixed to one end of said handle portion, and further including coupling bracket means affixed to said U-shaped bracket portion and detachably received by said coupling bracket means on said carriage; said coupling bracket means on said assembly and said coupling bracket means on said carriage constituting a horizontal pivot axis for said assembly and permitting said handle to be turned about said pivot axis up and down with respect to the plane of said base; and braking means affixed to said U-shaped bracket portion and extending on the opposite side of said horizontal pivot axis from said handle portion so as to engage at least one of the wheels of said carriage and provide a braking means for said carriage when said handle portion is turned in a particular direction about said pivot axis.

5. The combination defined in claim 4 in which one of the aforesaid coupling bracket means constitutes looped U-shaped members, and the other of the aforesaid coupling bracket means constitutes hook-shaped members.

6. The combination defined in claim 4, in which said braking means includes first and second brake members attached to said U-shaped bracket and displaced along an axis spaced from and parallel to the aforesaid horizontal pivot axis and in position to engage two of the wheels of the carriage as said handle portion is turned down about said pivot axis in a particular angular direction.

References Cited

UNITED STATES PATENTS

| | | | |
|---|---|---|---|
| 792,094 | 6/1905 | Ware | 16—172 |
| 3,322,436 | 5/1967 | Musiohuk | 280—87.01 |

BENJAMIN HERSH, Primary Examiner

ROBERT R. SONG, Assistant Examiner

U.S. Cl. X.R.

188—21, 119